Dec. 12, 1950  J. H. WILLIAMS  2,533,413
FLUID PRESSURE ACTUATED C-CLAMP
Filed May 27, 1946
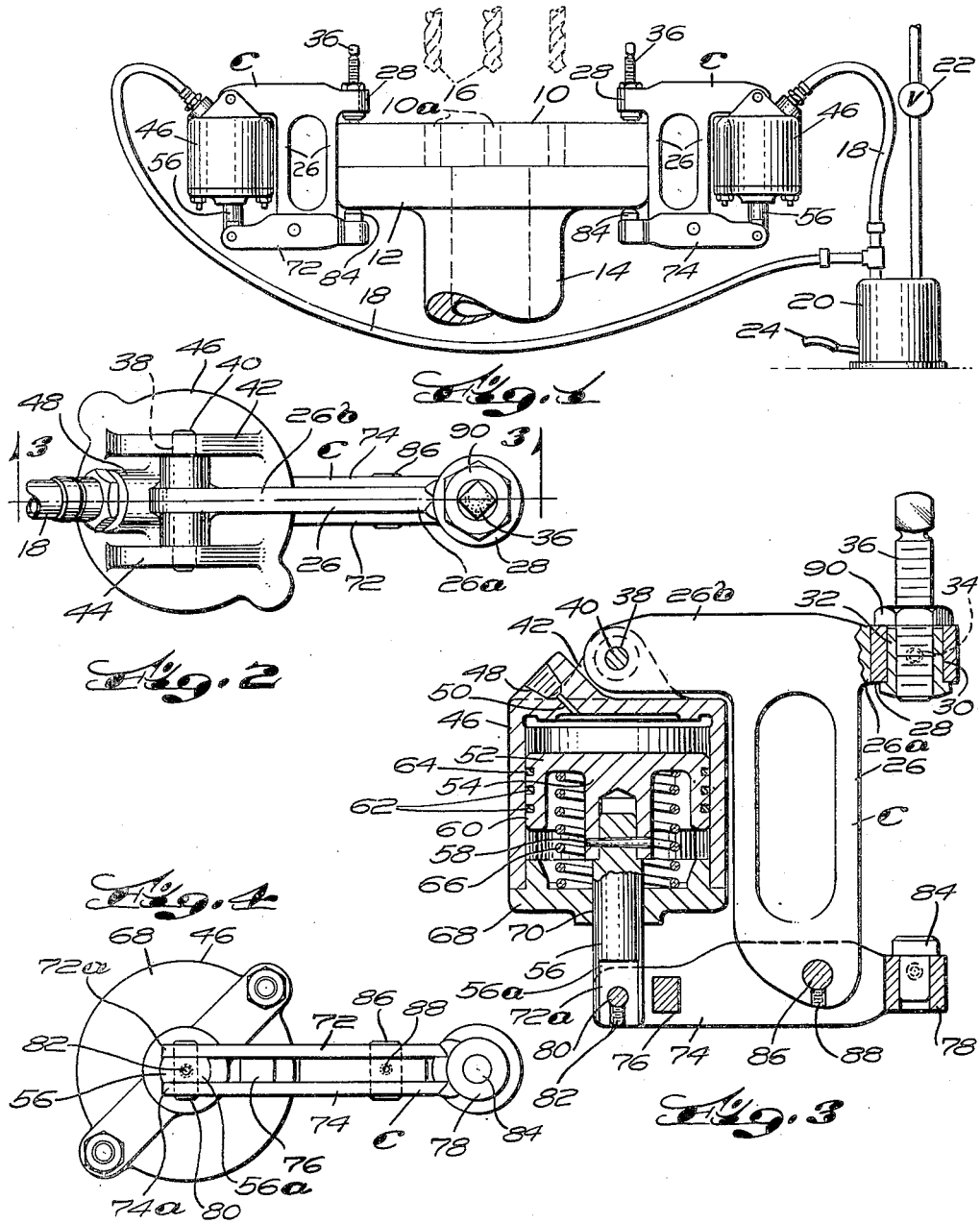
INVENTOR.
James Howard Williams
BY
Harry Dexter Peck
Attorney Patented Dec. 12, 1950

2,533,413

UNITED STATES PATENT OFFICE 2,533,413

FLUID PRESSURE ACTUATED C-CLAMP

James Howard Williams, Lincoln, R. I., assignor to Grinnell Corporation, Providence, R. I., a corporation of Delaware Application May 27, 1946, Serial No. 672,643

1 Claim. (Cl. 144—304)

This invention relates to improvements in fluid pressure actuated C-clamps.

C-clamps are used for temporarily holding separate elements together for various reasons. In the illustrative use of such a clamp shown herein, a faceplate is temporarily held on the flanged end of a pipe or pipe fitting in order that drills may pass through the plate and be supported thereby as they bore holes in the flange held thereagainst. Heretofore, so far as I am aware, C-clamps have been made only for manual use, that is to say, the clamping or holding grip of the clamp has depended upon a screw member being turned up tightly by hand or by wrench. This operation of clamping by hand screw or wrench is slow and inaccurate. Where the elements to be held together are large and require a strong clamping force to keep them immovable, the ordinary manually actuated C-clamp must be made so large to exert the necessary grip that the clamps themselves become somewhat unwieldy and are in the way of a machine tool doing work on one of the elements.

It is a principal object of the present invention to provide a simple but highly efficient C-clamp which is pressure-actuated, is simple in application and adjustment, and is so small, compared with hand-actuated clamps of corresponding power, as not to interfere with the operations to be performed or with the apparatus engaged in the performance. Moreover, because of the unusual clamping effect which is attainable with a single clamp constructed in accordance with the present invention, it is possible to hold elements together with only one or two of the improved clamps, where heretofore twice or several times as many hand clamps were required.

The best mode in which it has been contemplated applying the principles of my invention is shown in the accompanying drawings, but these are to be taken as merely illustrative for it is intended to cover by suitable expression in the appended claim whatever features of patentable novelty exist in the invention disclosed.

In the drawings:

Fig. 1 is a somewhat diagrammatic showing of how the improved clamp may be used;

Fig. 2 is a top plan view of a C-clamp embodying my improvements;

Fig. 3 is an elevation mostly in section as on line 3—3 of Fig. 2; and

Fig. 4 is a bottom plan view.

Referring to the drawings, and particularly to Fig. 1 for the moment, one important use of a C-clamp is to hold a faceplate 10 tightly against a flange 12 of a pipe 14 (representative of any flanged pipe or fitting) while a series of drills 16 are passed through a corresponding series of holes 10a in the faceplate to bore holes through the flange 12. In such work the faceplate must be immovably held in order that it may serve as a guide and steady the drills as they bore through the flange. Any disturbance of the faceplate relative to the flange will not only destroy the accuracy of the holes being bored but may cause breakage of one or more of the drills.

To bind the faceplate and flange together while the boring operation is performed it has been the practice heretofore to apply several hand-actuated C-clamps around the edge of the elements. If the holes to be bored are rather close together it may require a number of clamps, if such hand clamps are used, because each such clamp must be small or narrow enough to fit between the holes without interference with the drills. The use of so many hand clamps is objectionable not only because of the time that must be spent in tightening each one but because in the application of so many clamps individually there is danger of the faceplate being moved slightly with respect to the flange. If a smaller number of hand clamps are employed, each must be correspondingly stronger and that means larger in size, with more probable interference with the drills. And after the drilling is finished, more time is consumed in loosening and removing each hand clamp separately.

With my improved pressure-actuated C-clamp, despite the fact that it is very narrow and causes no interference, only two need be used because each is capable of exerting a very considerable pressure. Moreover the clamping effect of both clamps can be applied simultaneonusly and almost instantly, so that there is no danger of any relative displacement between the faceplate and the flange as the clamping forces are applied.

Each clamp C is connected by a flexible hose 18 with a foot-controlled air valve 20 to which air under pressure is constantly supplied while the hand shut-off valve 22 is open. In the preferred arrangement, this air pressure is effective on the clamps C, whenever the foot treadle 24 is free, or in the up-position as shown in Fig. 1. When this treadle is depressed by the operator's foot, the air is released from the clamps C so that they can be applied to or taken from the work.

Turning now to Fig. 3, the improved clamp has what may be termed a fixed jaw or a fixed piece 26, somewhat T-shaped, with one arm 26a having a cylindrical block 28 welded thereto which is provided with a hole 30 wherein is secured a bushing 32 by a set-screw 34. This bushing is internally threaded to receive an adjusting screw 36 which is hand set against the top surface of the faceplate 10. Another arm 26b extends on the opposite side of the piece 26, and has a hole 38 therethrough for an axle pin 40 which extends through a pair of separated brackets 42 and 44 formed on the top of a cylinder 46. By means of this pin and hole connection, the cylinder is slightly rotatable about the pin 40 with respect to the stationary piece 26.

At the top of the cylinder is an internally threaded boss 48 to which the air hose 18 is connected, and from which an air passage 50 leads to the chamber of the cylinder. Within this chamber is a piston 52 having a hollow central stem 54 below its head into which is nicely fitted a piston rod 56 and tightly secured thereto by a tapered pin 58. From the piston head a skirt 60 depends and this is provided with circumferential grooves 62 that carry piston rings 64. Between the central stem 54 and the skirt 60 a coiled compression spring 66 extends from the head of the piston to a bottom cover 68 of the cylinder and constitutes a simple embodiment of means effective upon release of the fluid pressure to bring about movement of the bearing studs relatively away from one another. The cover 68 has an axle hole 70 through which the piston rod 56 projects.

The outer end 56a of the piston rod is cut away on opposite sides to form a parallel faced portion which fits between two plates 72 and 74 that are welded to a spacing block 76 and to a cylindrical end block 78 to form what may be termed a movable jaw. The separated ends 72a and 74a of the plates have aligned holes through which extend an axle pin 80 that also extends through a hole in the piston rod and is secured to the latter by a set-screw 82. The cylindrical block 78 at the other end of the plates is bored to receive a bearing stud 84 which, as shown in Fig. 1, bears against the under side of the flange 12. Between this stud and the pin connection 80 with the piston rod, the plates extend along beside the lower end of the stationary piece 26, having a pivotal connection therewith by means of a pin 86 that extends through both plates and the piece 26 and is secured to the latter by a set-screw 88. Thus the plates, blocks and stud, constitute a lever by which the air force applied to the piston is multiplied in its application to the flange.

Referring now to Figs. 1 and 3, the operator places the faceplate on the flange to be bored and brings the drills 16 downward until they are inserted part way in the holes 10a of the faceplate. This definitely positions the latter. The pipe or fitting 14 is then moved, if necessary, so that the circumferential edge of its flange 12 registers with the corresponding edge of the faceplate, and then by usual means the pipe is secured in position. The operator then steps on the foot treadle 24 to release all air from the cylinders 46 of the clamps to be applied to the work. When this air is released, the spring 66 moves the piston 52 upward to the top of the piston, so that the lever 72 will be swung clockwise as seen in Fig. 3, thus lowering the bearing stud 84 so the clamp can be applied to the work by inserting this bearing stud under the flange and placing the adjusting stud 36 over the faceplate. The latter stud can be adjusted by hand to make contact with the faceplate when the lever, under pressure, is in substantially its horizontal position as seen in Fig. 3, thus providing for different spacings between this stud and the stud 84. A jamb nut 90 can be tightened to secure the stud in its adjusted position.

With his foot still on the treadle, the operator similarly applies another clamp C to the flange and faceplate in the manner just described, and preferably at a point about diametrically opposite the clamp first positioned. He can now steady each clamp in position with his hands while he removes his foot from the treadle. This will admit the air pressure to the cylinders, forcing the pistons downward to apply force on one end of the levers 72. This will force the bearing studs 84 against the flange and apply an exceedingly strong clamping or gripping force on the flange and faceplate to hold them tightly together.

For example, if the diameter of the piston head is 3 inches its area will be about 7 square inches. With an air pressure of say 90 pounds per square inch the total pressure acting on the piston is 630 pounds. If the spring 66 chosen has a constant of about 60 pounds per inch of deflection, and the piston moves downward about a half inch under the force of the air pressure, then the spring will resist with 30 pounds of force leaving 600 pounds effective on the piston end of the lever 72. If the distance between the axis of pin 80 and that of the fulcrum pin 86 is twice the distance between the axis of the fulcrum pin 86 and that of the bearing stud 84, the total force exerted by the latter will be substantially 1200 pounds. This, of course, is completely resisted by the arm 26a of the stationary piece 26 and so the clamping effect on the faceplate and flange is very considerable and makes clear that only two improved clamps need be used even with large pieces of work.

Each improved clamp may be separately operated by an individual foot valve or other valve of suitable application or a number of clamps may be operated simultaneously from one valve. While the drawings show the C-clamps in use for drilling a flange they may be used for many operations requiring assemblage or mating of parts during construction or test.

I claim:

A pressure actuated C-clamp having a T-shaped piece with one portion of the head of the piece extending on one side of the leg of the piece a greater distance than does the other portion of the head, the said shorter portion constituting a fixed jaw with an adjusting screw threaded therethrough for engaging the work to be clamped, the said longer portion having an axle pin therethrough with its axis at right angles to the head and leg axes of the T-shaped piece, and the said leg having near its end remote from the head a second axle pin therethrough with its axis parallel to that of the first mentioned axle pin; a lever mounted on the second mentioned axle pin having its longitudinal axis in the plane defined by the head and leg axes of the T-shaped piece, the said lever having a short arm on one side of said second mentioned axle pin with a bearing stud mounted thereon opposite the said adjusting screw to clamp the work between them, the longer arm of the lever having a third axle pin with its axis parallel to that of the first mentioned axle pin; pressure actuated means pivotally mounted on and between the first and third mentioned axle pins, the said pressure actuated means comprising a cylinder with its head end engaging the first mentioned axle pin; a piston in said cylinder; a piston rod connected to said piston and extending through the bottom end of the cylinder to the said third axle pin whereby when fluid pressure is imposed on one side of the piston head force is transmitted through the piston rod and lever to apply a clamping hold on the work; and a coiled spring in the cylinder between the other side of the piston head and the bottom of the cylinder for moving the cylinder reversely when the said fluid pressure on the piston is released, whereby the clamping hold on the work is released.

JAMES HOWARD WILLIAMS.

REFERENCES CITED

The following references are of record in the file of this patent:

UNITED STATES PATENTS

| Number | Name | Date |
| --- | --- | --- |
| 710,544 | Wandell | Oct. 7, 1902 |
| 1,060,477 | Meyers | Apr. 29, 1913 |
| 1,490,063 | Tower | Apr. 8, 1924 |
| 2,362,707 | Malmquist | Nov. 14, 1944 |
| 2,439,135 | Johnson et al. | Apr. 6, 1948 |

FOREIGN PATENTS

| Number | Country | Date |
| --- | --- | --- |
| 707,064 | Germany | June 12, 1941 |